United States Patent [19]

Saito

[11] Patent Number: 4,681,861

[45] Date of Patent: Jul. 21, 1987

[54] SILICON CARBIDE SINTERED BODY AND PROCESS FOR PRODUCTION THEREOF

[75] Inventor: Akira Saito, Kokubu, Japan

[73] Assignee: Kyocera Corporation, Kyoto, Japan

[21] Appl. No.: 823,931

[22] Filed: Jan. 29, 1986

[30] Foreign Application Priority Data

Jan. 31, 1985 [JP] Japan ................................. 60-19068

[51] Int. Cl.⁴ ........................................... C04B 35/56
[52] U.S. Cl. ...................................... 501/89; 501/91; 501/96; 501/93; 501/132
[58] Field of Search ....................... 501/89, 91, 92, 93, 501/88, 132, 96

[56] References Cited

U.S. PATENT DOCUMENTS 3,220,860 11/1965 Robiette et al. ................. 501/132 X
4,541,975 9/1985 Honma et al. .................... 501/92 X
4,569,921 2/1986 Omori et al. ..................... 501/88 X

FOREIGN PATENT DOCUMENTS 0196770 12/1982 Japan ................................. 501/91

Primary Examiner—William R. Dixon, Jr.
Assistant Examiner—Karl Group
Attorney, Agent, or Firm—Spensley Horn Jubas & Lubitz

[57] ABSTRACT

A silicon carbide powder consisting of an aluminum component such as aluminum nitride and aluminum oxide and a chromium component such as chromium carbide as essential ingredients and if desired, a rare earth element such as yttria is sintered into an integrated molded article. This sintered article has excellent strength and toughness and a markedly reduced tendency to undergo corrosion when brought into contact with iron at high temperatures.

13 Claims, 3 Drawing Figures

(X 800)

(X 800)

(X 800)

SILICON CARBIDE SINTERED BODY AND PROCESS FOR PRODUCTION THEREOF

BACKGROUND OF THE INVENTION

1. Field of the Invention

This invention relates to a process for producing a silicon carbide sintered body having excellent strength and toughness and high corrosion resistance and being particularly suitable as a contacting part requiring excellent corrosion resistance under severe conditions, such as a skid button to be in contact with iron at high temperatures. The present invention also relates to a novel silicon carbide sintered body having a fine structure.

2. Description of the Prior Art

Because of its various excellent properties such as oxidation resistance, corrosion resistance, heat resistance, thermal shock resistance and high-temperature strength, the silicon carbide sintered body is a suitable material for high-temperature gas turbine parts, automobile engine parts, corrosion-resistant parts and abrasion-resistant parts. However, since silicon carbide is difficult to sinter, it has been the practice to obtain a dense and compact sintered body of silicon carbide by adding various sintering aids. Boron (B)-carbon (C) type additives are examples of the sintering aids. To obtain a dense sintered body, firing at relatively high temperatures is necessary. Furthermore, since the crystalline structure of the sintered body generally consists of isometric grains, there is very little grain boundary phase. Owing to this, therefore, the toughness of the sintered body is low, and a further improvement in corrosion resistance at high temperatures cannot be expected. For example, the corrosion resistance of such a sintered body is still not satisfactory enough for use as a material for skid buttons which come into contact with iron, etc. at high temperatures.

As is well known, by using a silicon carbide sintered body as a material for a skid button, a cooling source for the skid button can be obviated, and at the same time, the occurrence of skid marks is reduced and the thermal efficiency of the inside of a heating furnace can be improved.

In using the skid button, however, a slab heated to the red-hot state comes into contact with the silicon carbide sintered body. At this time, the siliceous component in silicon carbide reacts with iron to form a molten reaction product, and the corrosion of the sintered body easily proceeds.

The use of aluminum-type additives such as alumina ($Al_2O_3$) easily gives a dense sintered body. But it is known in this case that since the sintered body has a large volume, the density of the sintered body becomes non-uniform between its inside and outside. Specifically, when an aluminum-type additive is used, it must be added in an amount of at least 3% by weight as aluminum. Thus, the amount of grain boundary components is large and the amount of decomposition thereof is large. The density of the sintered body varies from its inside to its outside, and no excellent corrosion resistance is obtained.

BRIEF SUMMARY OF THE INVENTION

It is an object of this invention to provide a silicon carbide sintered body having a uniform density throughout its inside and outside and excellent strength and toughness, and a process for its production.

Still another object of this invention is to provide a silicon carbide sintered body having high corrosion resistance, especially when brought into contact with iron at high temperatures, and a processes for its production, and therefore provide a silicon carbide sintered body as a material suitable for making parts which come into contact with iron at high temperatures, such as skid buttons in particular.

According to this invention, there is provided a process for producing a silicon carbide sintered body, which comprises mixing (i) a starting material composed of 3.5 to 10% by weight, calculated as elemental aluminum, of at least one component selected from the group consisting of aluminum and aluminum compounds, 0.2 to 5% by weight, calculated as elemental chromium, of at least one component selected from the group consisting of chromium and chromium compounds and the balance being silicon carbide, or (ii) a starting material composed of 0.2 to 5% by weight, calculated as elemental aluminum, of at least one component selected from the group consisting of aluminum and aluminum compounds, 0.2 to 5% by weight, calculated as a elemental rare earth element, of at least one rare earth compound, 0.2 to 10% by weight, calculated as elemental chromium, of at least one component selected from the group consisting of chromium and chromium compounds, and the balance being silicon carbide; and sintering the mixed powder into an integrated molded article.

According to this invention, there is also provided (a) a silicon carbide sintered body composed of 3.5 to 10% by weight, calculated as elemental aluminum, of an aluminum component, 0.2 to 5% by weight, calculated as elemental chromium, of a chromium component and the balance being silicon carbide, or (b) a silicon carbide sintered body composed of 0.2 to 5% by weight, calculated as elemental aluminum, of an aluminum component, 0.2 to 5% by weight, calculated as elemental rare earth, of a rare earth component, 0.2 to 10% by weight, calculated as elemental chromium, of a chromium component and the balance being silicon carbide, wherein said silicon carbide is present as particles of the alpha-type crystal structure which are substantially spherical and have an average particle diameter of 0.5 to 2 micrometers, and wherein particles which contain chromium as a main component and aluminum and silicon when analyzed by an X-ray microanalyzer and shows a high luminance under a metallurgical microscope are present in the crystal grain boundary containing the aluminum component and the chromium component and as an optional component the rear earth element component.

DETAILED DESCRIPTION OF PREFERRED EMBODIMENTS

The marked characteristic feature of the silicon carbide sintered body of this invention is that the chromium and aluminum components are present in the crystal grain boundary of silicon carbide, and the chromium compound is present in this crystal grain boundary as masses or particles having a fixed particle size. More specifically, the present invention is based on the new finding that the chromium component present in the aforesaid form in the crystal grain boundary of the silicon carbide sintered body inhibits the reaction of iron in contact with the silicon carbide sintered body at high temperatures with a siliceous component (actually silicon oxide present on the surface) contained in silicon carbide and thus markedly inhibits the corrosion of the sintered body, and also effectively obviates the degradation of various properties caused as a result of the silicon carbide sintered body becoming amorphous.

In the silicon carbide sintered body of this invention, silicon carbide is present as particles of the alpha-type crystal structure which are substantially spherical, and have an average particle diameter (the number average particle diameter determined by an electromicrophotograph of the sintered body) of 0.5 to 2 micrometers, and a maximum particle diameter of not more than 20 micrometers, especially not more than 5 micrometers. Thus, in this sintered body, the particle diameter is nearly uniform, and the particles are nearly spherical and isometric. The ratio of the maximum size to the minimum size in one particle is not more than 2.

The characteristic feature of the present invention is that a grain boundary compound or a grain boundary composition comprising the aluminum component and the chromium component and optionally the rare earth element component as well exists in the grain boundaries of these crystal grains.

Figure 1:
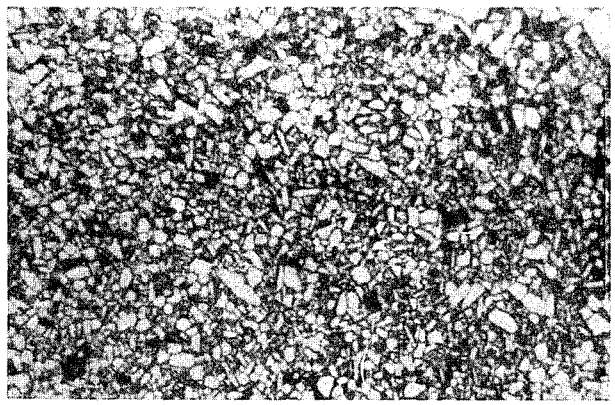
FIG. 1 is a microphotograph (magnification 800×) showing the fine structure of the crystal grain boundary of the silicon carbide sintered body (a) in accordance with this invention (sample No. 4 to be described hereinafter)
Figure 2:
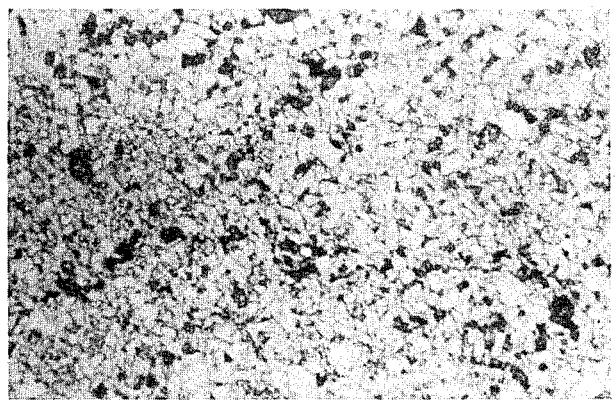
FIG. 2 is a microphotograph (magnification 800×) showing the fine structure of the crystal grain boundary of the silicon carbide sintered body (b) in accordance with this invention (sample No. 33 to be described hereinafter)
Figure 3:
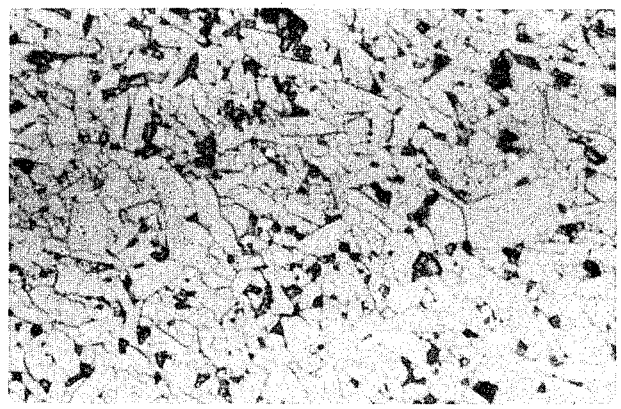
FIG. 3 is a microphotograph (magnification 800×) showing the fine structure of the crystal grain boundary of a silicon carbide sintered body (sample No. 50 to be described hereinafter) containing an aluminum component and a rare earth element component but being free from a chromium component.

As is clear from a comparison of FIGS. 1 and 2 showing the sintered bodies of this invention with FIG. 3 which shows an SiC sintered body not containing the chromium component, the present inventors have newly found that particles having a very high luminance under a reflection-type metal microscope and a particle diameter of 0.5 to 20 micrometers are present in the sintered bodies of this invention. An analysis with an X-ray microanalyzer has shown that these particles contain chromium as a main component and aluminum and silicon.

It has not yet been elucidated why the chromium-containing particles present in the grain boundary act effectively for preventing corrosion of the sintered body itself even when the sintered body comes into contact with iron at high temperature. The present inventors, however, assume that the SiC crystal grains are protected with the dense grain boundary particle or composition, and the inclusion of the chromium component into iron oxide and silicon oxide increases their melting points whereby the formation of a molten reaction product is inhibited.

In the sintered bodies of this invention, the content of silicon carbide is desirably 85 to 97% by weight, particularly 90 to 95% by weight, for the sintered body (a), and 83 to 97% by weight, particularly 90 to 95% by weight, for the sintered body (b). In the sintered body (a), the presence of 0.2 to 5% by weight, especially 0.4 to 3.5% by weight, calculated as elemental chromium of the chromium component is important in view of corrosion resistance. On the other hand, the aluminum component is present preferably in an amount of 3.5 to 10% by weight, particularly 3 to 6% by weight, calculated as elemental aluminum.

In the sintered body (b) containing the rare earth component, the content of the chromium component or the aluminum component may be lower than that in the sintered body (a). Desirably, the chromium component is present in an amount of 0.2 to 10% by weight, especially 0.4 to 5% by weight; the aluminum component is present in an amount of 0.2 to 5% by weight, especially 0.2 to 3% by weight; and the rare earth component is present in an amount of 0.2 to 5% by weight, especially 0.2 to 2% by weight.

The process for producing the sintered bodies of this invention will be described below.

Silicon carbide used as a starting powder may be of the alpha-phase or the beta-phase. Desirably, however, silicon carbide of the alpha-phase which can be produced in quantities at low cost is used. It desirably has an average particle diameter of not more than 1.0 micrometer, preferably not more than 0.5 micrometer.

Examples of the aluminum element or compound (first component) include metallic aluminum and the oxide, carbide, nitride and sulfide of aluminum. Specific examples include alumina powder, alumina sol, alumina gel, aluminum carbide ($Al_4C_3$), aluminum nitride (AlN), aluminum sulfate, aluminum nitrate ($Al(NO_3)_3$) and aluminum carbide ($Al_2(CO_3)_3$).

The aluminum components promotes sintering of SiC and itself forms a crystal grain boundary. Of these aluminum compounds, alumina and aluminum nitride are especially preferred. Since alumina has a high melting point and melts at a temperature close to, but lower than, the sintering temperature of SiC, a homogeneous and dense sintered body can be obtained. On the other hand, since alumina nitride has a higher melting point than alumina and has a reduced tendency to release oxygen as is the cse with an oxide and form voids during sintering, it is best suited for the purpose of producing a sintered body having best heat resistance and compactness.

Examples of chromium element or compounds (2nd component) include metallic chromium, chromium oxide, chromium carbide, chromic acid salts and chromium halides. The use of chromium carbide is most desirable in this invention. When chromium oxide is used, oxygen is liberated and released during sintering, and chromium silicide tends to form. Hence, voids tend to occur in the sinterd body, and its mechanical strength is liable to be reduced. $Cr_3C_2$ having a high melting point is used most advantageously as the chromium carbide. $Cr_7C_3$ and $Cr_{23}C_6$ may also be feasible.

Examples of the rare earth elements and compounds (third component) used in the starting powder (ii) desirably include, Sc, Y, La, Ce, Pr, Nd, Pm, Sm, Eu, Gd, Tb, Dy, Ho, Er, Tm, Yb and Lu, the oxides, nitrides, hydroxides, fluorides, chlorides, bromides, iodides, carbonates, nitrates, hydroxides, alkoxides, phosphates, oxalates and sulfates of these elements. It is desirable to use the oxides having excellent stability at high temperatures and the carbonates, nitrates, hydroxides and alkoxides which are converted to oxides during firing.

The third component decreases the total amount of the sintering aids, improves sinterability, and consequently further increases strength and corrosion resistance at high temperatures.

In the starting powder (i), the first component is used in an amount of 3.5 to 10% by weight, preferably 3 to 6% by weight, calculated as Al. If its amount is below the lower limit specified, the sinterability of the starting powder is unsatisfactory and a sintered body having a sufficient density cannot be obtained. If it exceeds the specified upper limit, the strength of the sintered body at high temperature is reduced and its corrosion resistance is liable to be deteriorated. The object of this invention is advantageously achieved by using the second component in an amount of 0.2 to 5% by weight, preferably 0.4 to 3.5% by weight, calculated as Cr.

In the starting powder (ii), the amount of the first component added is set at 0.2 to 5% by weight, preferably 0.2 to 3% by weight, calculated as Al. If it is less than 0.2%, a sintered body having a sufficient density cannot be obtained. If it exceeds 5% by weight, the strength of the resulting sintered body at high temperatures is reduced and its corrosion resistance is lowered. Particularly, large amounts of compounds readily reactive with iron or iron oxide remain in the grain boundary, the corrosion resistance of the resulting sintered body upon contact with iron or iron oxide at high temperatures is markedly reduced.

The amount of the second component is set at 0.2 to 10% by weight, preferably 0.4 to 5% by weight.

The amount of the third component is set at 0.2 to 5% by weight, preferably 0.2 to 2% by weight, calculated as elemental rare earth. If it is less than 0.2% by weight, the sintering of the starting material becomes insufficient. If it exceeds 5% by weight, the excess of the elemental rare earth remains in the grain boundary to reduce the corrosion resistance of the sintered body.

In the process of this invention, the amounts of the first component, the second component and the third component are set within the specified ranges, and the compounds or elements in each of these components may be used singly or in combination. The components which are in the form of a solution in the starting material promote compaction of the sintered body. If they are powdery, it is desirably to decrease their particle diameters. There is no particularly strict limitation on the average particle size of these compounds, average particles of not more than 1.0 micrometer are desirable.

The silicon carbide sintered bodies in accordance with this invention contain the first to the third component as essential ingredients, but the inclusion of other components is not excluded in the sintered bodies of this invention.

When a pulverizing medium such as balls is used at the time of mixing and pulverizing the components, the components constituting the pulverizing medium naturally get mixed with the pulverized mixture. The inclusion of such components is of course permissible unless they react silicon carbide or with the first to the third components or produce deleterious effects during the sintering.

Examples of the components whose inclusion in the silicon carbide sintered bodies of this invention is permissible include zirconia ($ZrO_2$), tungsten carbide (WC), and silicon nitride ($Si_3N_4$). It is permissible to include the first to the third component into the pulverized mixture by including components such as alumina in the balls, or using alumina balls.

In the process of this invention, the material obtained as above is wet-mixed and a molding binder is added. After drying and granulating them, the granules are molded into the desired shape by a press method, etc.

Thereafter, the molded article is sintered in a non-oxidizing atmosphere under an argon atmosphere or a nitrogen-containing atmosphere. Or press sintering (hot press, etc.) in which the molding and sintering are carried out simultaneously may be carried out.

According to the process of this invention, the sintering temperature is set within the range of 1850° to 2050° C., preferably 1900° to 1950° C. (in the hot press, temperatures in the range of 1750° to 2050° C.). If it is lower than 1850° C., the sintering becomes insufficient, and a sintered body having a uniform texture cannot be obtained. If it exceeds 2050° C., decomposition during the sintering occurs vigorously, and the grains grow abnormally. Furthermore, the properties of the resulting sintered body are degraded remarkably. The foregoing fact has been confirmed experimentally. The suitable firing time is about 0.5 to 10 hours.

The following examples illustrate the present invention more specifically.

EXAMPLE 1

The first component (average particle diameter 0.6 micrometer), the second component (average diameter 0.5 micrometer) and the third component (average particle diameter 0.8 micrometer) were added to an alpha-phase SiC powder (average particle diameter 0.5 micrometer) in the proportions indicated in Table 1.

These powders were mixed in the wet state in a rotary mill, and a moderate amount of a solution of an organic binder was added to the resulting slurry. The mixture was then dried and granulated by spraying. The granules were then molded into a flat plate having a size of $120 \times 120 \times 10$ mm, and after removing the binder, was sintered in an inert atmosphere at each of the firing temperatures shown in Table 1.

By the foregoing procedure, samples Nos. 1 to 54 were obtained.

From the resulting sintered body, a test piece, $4 \times 3 \times 35$ mm (the bent piece shape in accordance with JIS) was cut out, and its flexural strength at ordinary temperature and 1300° C. was measured by the 4-point bending test method set forth in JIS R-1601. Toughness was determined by applying a fixed load to each sample by means of a Vicker's presser, and measuring fracture toughness from the length of a crack formed from the edge of a pressing scar generated by the aforesaid presser.

The corrosion resistance test was carried out as follows:

A flat plate, $100 \times 100 \times 5$ mm, was cut out, and as steel piece of the same shape subjected to an oxidation treatment was placed on the flat plate. In an oxidizing atmosphere containing 20 vol. % of steam at 1250° C., the steel piece was repeatedly placed and removed on and from the flat plate at a rate of 10 sec/cycle over 24 hours. Then, the amount of corrosion of the flat plate by the steel piece was measured, and the state of corrosion was evaluated on the following scale of 1, 2, 3, 4 and 5.

| Rating | State of corrosion |
|---|---|
| 1 | By the formation of a molten iron-silica reaction product, the corrosion on the upper |

| Rating | State of corrosion |
|---|---|
| | surface of the sintered body sample exceeded 3 mm in length. The corner portions were rounded as a result of corrosion, and the under surface of the sample was also corroded by the molten reaction product. |
| 2 | The corrosion of the upper surface reached the order of 2 mm, and the corner portions of the upper surface were rounded. The molten reaction product also flowed onto an alumina plate used as a support of the sample. |
| 3 | The entire upper surface of the sintered body sample was corroded, and the molten reaction product flowed and dropped onto the side surface. The amount of corrosion was within 1 mm. |
| 4 | Several points occur which were corroded to an extent of less than 1 mm in diameter. In other parts, no corrosion was observed. |
| 5 | No corrosion owing to reaction with iron or iron oxide was observed in the sintered body sample. |

TABLE 1

| Sample No. | SIC Proportion | 1st Component Type | 1st Component Proportion | 1st Component Proportion as Al | 2nd Component Type | 2nd Component Proportion | 2nd Component Proportion as Cr | 3rd Component Type | 3rd Component Proportion | 3rd Component Proportion as rare earth element |
|---|---|---|---|---|---|---|---|---|---|---|
| 1* | 93.0 | AlN | 4.5 | 3 | $Cr_3C_2$ | 1.2 | 1 | $Y_2O_3$ | 1.3 | 1 |
| 2* | 89.6 | $Al_2O_3$ | 5.7 | 3 | $Cr_3C_2$ | 3.5 | 3 | $Y_2O_3$ | 1.3 | 1 |
| 3 | 93.0 | AlN | 4.5 | 3 | $Cr_3C_2$ | 1.2 | 1 | $Y_2O_3$ | 1.3 | 1 |
| 4 | 89.5 | $Al_2O_3$ | 5.7 | 3 | $Cr_3C_2$ | 3.5 | 3 | $Y_2O_3$ | 1.3 | 1 |
| 5* | 94.8 | $Al_2O_3$ | 0.2 | 0.1 | $Cr_3C_2$ | 1.2 | 1 | $Y_2O_3$ | 3.8 | 3 |
| 6 | 94.7 | $Al_2O_3$ | 3.8 | 0.2 | $Cr_3C_2$ | 1.2 | 1 | $Y_2O_3$ | 3.8 | 3 |
| 7 | 95.7 | $Al_2O_3$ | 1.9 | 1 | $Cr_3C_2$ | 1.2 | 1 | $Y_2O_3$ | 1.3 | 1 |
| 8* | 84.3 | $Al_2O_3$ | 13.2 | 7 | $Cr_3C_2$ | 1.2 | 1 | $Y_2O_3$ | 1.3 | 1 |
| 9* | 94.8 | AlN | 0.2 | 0.1 | $Cr_3C_2$ | 1.2 | 1 | $Y_2O_3$ | 3.8 | 3 |
| 10 | 94.7 | AlN | 0.3 | 0.2 | $Cr_3C_2$ | 1.2 | 1 | $Y_2O_3$ | 3.8 | 3 |
| 11 | 90.5 | AlN | 4.5 | 3 | $Cr_3C_2$ | 1.2 | 1 | $Y_2O_3$ | 3.8 | 3 |
| 12* | 84.4 | AlN | 10.6 | 7 | $Cr_3C_2$ | 1.2 | 1 | $Y_2O_3$ | 3.8 | 3 |
| 13* | 93.0 | $Al_2O_3$ | 5.7 | 3 | $Cr_3C_2$ | 1.2 | 1 | $Y_2O_3$ | 0.1 | 0.1 |
| 14 | 92.6 | $Al_2O_3$ | 5.7 | 3 | $Cr_3C_2$ | 1.2 | 1 | $Y_2O_3$ | 0.5 | 0.4 |
| 15 | 91.8 | $Al_2O_3$ | 5.7 | 3 | $Cr_3C_2$ | 1.2 | 1 | $Y_2O_3$ | 1.3 | 1 |
| 16 | 88.0 | $Al_2O_3$ | 5.7 | 3 | $Cr_3C_2$ | 1.2 | 1 | $Y_2O_3$ | 5.1 | 4 |
| 17* | 83.9 | $Al_2O_3$ | 5.7 | 3 | $Cr_3C_2$ | 1.2 | 1 | $Y_2O_3$ | 10.2 | 8 |
| 18* | 92.9 | $Al_2O_3$ | 5.7 | 3 | $Cr_3C_2$ | 0.1 | 0.1 | $Y_2O_3$ | 1.3 | 1 |
| 19 | 92.7 | $Al_2O_3$ | 5.7 | 3 | $Cr_3C_2$ | 0.3 | 0.3 | $Y_2O_3$ | 1.3 | 1 |
| 20 | 91.8 | $Al_2O_3$ | 5.7 | 3 | $Cr_3C_2$ | 1.2 | 1 | $Y_2O_3$ | 1.3 | 1 |
| 21 | 89.5 | $Al_2O_3$ | 5.7 | 3 | $Cr_3C_2$ | 3.5 | 3 | $Y_2O_3$ | 1.3 | 1 |
| 22 | 83.8 | $Al_2O_3$ | 5.7 | 3 | $Cr_3C_2$ | 9.2 | 8 | $Y_2O_3$ | 1.3 | 1 |
| 23* | 79.2 | $Al_2O_3$ | 5.7 | 3 | $Cr_3C_2$ | 13.8 | 12 | $Y_2O_3$ | 1.3 | 1 |
| 24 | 94.7 | Al | 0.5 | 0.5 | $Cr_3C_2$ | 3.5 | 3 | $Y_2O_3$ | 1.3 | 1 |
| 25 | 93.2 | Al | 2 | 2 | $Cr_3C_2$ | 3.5 | 3 | $Y_2O_3$ | 1.3 | 1 |
| 26 | 89.6 | $Al_2O_3$ | 5.7 | 3 | $Cr_3C_2$ | 3.5 | 3 | $La_2O_3$ | 1.2 | 1 |
| 27 | 89.6 | $Al_2O_3$ | 5.7 | 3 | $Cr_3C_2$ | 3.5 | 3 | $CeO_2$ | 1.2 | 1 |
| 28 | 89.6 | $Al_2O_3$ | 5.7 | 3 | $Cr_3C_2$ | 3.5 | 3 | $Pr_6O_{11}$ | 1.2 | 1 |
| 29 | 89.6 | $Al_2O_3$ | 5.7 | 3 | $Cr_3C_2$ | 3.5 | 3 | $Nd_2O_3$ | 1.2 | 1 |
| 30 | 89.6 | $Al_2O_3$ | 5.7 | 3 | $Cr_3C_2$ | 3.5 | 3 | $Sm_2O_3$ | 1.2 | 1 |
| 31 | 89.6 | $Al_2O_3$ | 5.7 | 3 | $Cr_3C_2$ | 3.5 | 3 | $Gd_2O_3$ | 1.2 | 1 |
| 32 | 89.6 | $Al_2O_3$ | 5.7 | 3 | $Cr_3C_2$ | 3.5 | 3 | $Tb_2O_3$ | 1.2 | 1 |
| 33 | 89.7 | $Al_2O_3$ | 5.7 | 3 | $Cr_3C_2$ | 3.5 | 3 | $Dy_2O_3$ | 1.1 | 1 |
| 34 | 89.7 | $Al_2O_3$ | 5.7 | 3 | $Cr_3C_2$ | 3.5 | 3 | $Er_2O_3$ | 1.1 | 1 |
| 35 | 89.7 | $Al_2O_3$ | 5.7 | 3 | $Cr_3C_2$ | 3.5 | 3 | $Yb_2O_3$ | 1.1 | 1 |
| 36 | 91.9 | $Al_2O_3$ | 5.7 | 3 | $Cr_3C_2$ | 1.2 | 1 | YN | 1.2 | 1 |
| 37 | 87.7 | $Al_2O_3$ | 5.7 | 3 | $Cr_3C_2$ | 3.5 | 3 | $Y(NO_3)_3$ | 3.1 | 1 |
| 38 | 88.5 | $Al_2O_3$ | 5.7 | 3 | $Cr_3C_2$ | 5.8 | 5 | $Y_2(CO_3)_3$ | 2.0 | 1 |
| 39 | 92.7 | AlN | 4.5 | 3 | $Cr_2O_3$ | 1.5 | 1 | $Y_2O_3$ | 1.3 | 1 |
| 40 | 89.8 | AlN | 4.5 | 3 | $Cr_2O_3$ | 4.4 | 3 | $Y_2O_3$ | 1.3 | 1 |
| 41 | 86.9 | AlN | 4.5 | 3 | $Cr_2O_3$ | 7.3 | 5 | $Y_2O_3$ | 1.3 | 1 |
| 42 | 97.2 | AlN | 4.5 | 3 | Cr | 1 | 1 | $Y_2O_3$ | 1.3 | 1 |
| 43 | 91.2 | AlN | 4.5 | 3 | Cr | 3 | 3 | $Y_2O_3$ | 1.3 | 1 |
| 44 | 89.9 | $Al_2O_3$ / AlN | 3.8 / 1.5 | 2 / 1 | $Cr_2C_3$ | 3.5 | 3 | $Y_2O_3$ | 1.3 | 1 |
| 45 | 91.2 | Al / AlN | 1.0 / 3.0 | 1 / 2 | $Cr_2C_3$ | 3.5 | 3 | $Y_2O_3$ | 1.3 | 1 |
| 46 | 89.6 | $Al_2O_3$ | 5.7 | 3 | $Cr_2C_3$ | 3.5 | 3 | $Y_2O_3$ / $Dy_2O_3$ | 0.6 / 0.6 | 0.5 / 0.5 |
| 47 | 89.6 | $Al_2O_3$ | 5.7 | 3 | $Cr_2C_3$ | 3.5 | 3 | $CeO_2$ / $Gd_2O_3$ | 0.6 / 0.6 | 0.5 / 0.5 |
| 48 | 89.2 | $Al_2O_3$ | 5.7 | 3 | $Cr_2C_3$ / $Cr_2O_3$ | 2.3 / 1.5 | 2 / 1 | $Y_2O_3$ | 1.3 | 1 |
| 49* | 87.2 | $Al_2O_3$ | 5.7 | 3 | $Cr_2C_3$ | 5.8 | 5 | $Y_2O_3$ | 1.3 | 1 |
| 50* | 94.9 | $Al_2O_3$ | 3.8 | 2 | — | — | — | $Y_2O_3$ | 1.3 | 1 |
| 51* | 94.0 | — | — | — | $Cr_2C_3$ | 3.5 | 3 | $Y_2O_3$ | 2.5 | 2 |

TABLE 1-continued

| | | | | | | | | | | |
|---|---|---|---|---|---|---|---|---|---|---|
| 52* | 90.8 | Al₂O₃ | 5.7 | 3 | Cr₂C₃ | 3.5 | 3 | — | — | — |
| 53* | 90.6 | Al₂O₃ | 9.4 | 5 | — | — | — | — | — | — |
| 54* | 95.5 | { B₄C / C } | 0.5 / 4 | — | — | — | — | — | — | — |

| Sample No. | Sintering Temperature (°C.) | Strength (room temp.) (kg/mm²) | Strenth (1300° C.) (kg/mm²) | Toughness Kic (MN/m^{3/2}) | Corrosion Resistance |
|---|---|---|---|---|---|
| 1* | 1800 | 13 | — | — | 2 |
| 2* | 1800 | 17 | — | — | 3 |
| 3 | 1850 | 39 | 34 | 5 | 5 |
| 4 | 1850 | 36 | 36 | 6 | 5 |
| 5* | 1900 | 21 | — | — | 2 |
| 6 | 1900 | 30 | 32 | 6 | 4 |
| 7 | 1900 | 34 | 37 | 5 | 5 |
| 8* | 1900 | 32 | 29 | 5 | 2 |
| 9* | 1950 | 18 | — | — | 3 |
| 10 | 1950 | 33 | 31 | 5 | 4 |
| 11 | 1950 | 40 | 38 | 6 | 4 |
| 12* | 1950 | 45 | 34 | 6 | 2 |
| 13* | 1950 | 26 | 22 | — | 3 |
| 14 | 1950 | 41 | 36 | 6 | 5 |
| 15 | 1950 | 40 | 38 | 6 | 5 |
| 16 | 1950 | 34 | 31 | 6 | 4 |
| 17* | 1950 | 31 | 29 | 5 | 1 |
| 18* | 1950 | 53 | 40 | 6 | 1 |
| 19 | 1950 | 47 | 41 | 6 | 4 |
| 20 | 1950 | 44 | 36 | 6 | 5 |
| 21 | 1950 | 44 | 37 | 6 | 5 |
| 22 | 1950 | 34 | 31 | 5 | 4 |
| 23* | 1950 | 26 | 24 | — | 4 |
| 24 | 1950 | 33 | 30 | 5 | 5 |
| 25 | 1950 | 38 | 37 | 6 | 5 |
| 26 | 1950 | 41 | 39 | 6 | 5 |
| 27 | 1950 | 38 | 31 | 6 | 5 |
| 28 | 1950 | 36 | 32 | 6 | 5 |
| 29 | 1950 | 42 | 35 | 6 | 5 |
| 30 | 1950 | 40 | 34 | 6 | 5 |
| 31 | 1950 | 41 | 37 | 6 | 5 |
| 32 | 1950 | 43 | 36 | 6 | 5 |
| 33 | 1950 | 41 | 35 | 6 | 5 |
| 34 | 1950 | 36 | 37 | 6 | 5 |
| 35 | 1950 | 38 | 34 | 6 | 5 |
| 36 | 1950 | 39 | 33 | 6 | 5 |
| 37 | 1950 | 34 | 31 | 6 | 5 |
| 38 | 1950 | 35 | 30 | 6 | 5 |
| 39 | 1950 | 40 | 36 | 6 | 5 |
| 40 | 1950 | 33 | 32 | 6 | 5 |
| 41 | 1950 | 32 | 30 | 5 | 5 |
| 42 | 1950 | 46 | 37 | 5 | 5 |
| 43 | 1950 | 39 | 33 | 5 | 5 |
| 44 | 1950 | 36 | 34 | 6 | 5 |
| 45 | 1950 | 39 | 33 | 6 | 5 |
| 46 | 1950 | 41 | 40 | 6 | 5 |
| 47 | 1950 | 42 | 41 | 6 | 5 |
| 48 | 1950 | 37 | 33 | 6 | 5 |
| 49* | 2100 | 25 | 27 | 6 | 2 |
| 50* | 1950 | 56 | 39 | 6 | 1 |
| 51* | 1950 | 24 | — | — | 1 |
| 52* | 1950 | 28 | 23 | — | 3 |
| 53* | 1900 | 46 | 32 | 5 | 1 |
| 54* | 2000 | 38 | 39 | 3 | 1 |

*The asterisked samples are outside the scope of the present invention.

As shown in Table 1, it was found that samples Nos. 3, 4, 6, 7, 10, 11, 14–16, 19–22, and 24–49 within the scope of this invention had a strength of at least 30 kg/mm² and a toughness of at least 5 MN/m^{3/2} and showed excellent corrosion resistance. In all of these samples, the density and hardness of pieces cut out from the central part and the peripheral part of the sintered body were measured. There was scarcely any difference in density and hardness between the central part and the peripheral part, and the sintered body was homogeneous and compact.

Samples Nos. 1 and 2 were insufficiently sintered because the sintering temperature was low. Samples Nos. 5, 8, 9 and 12 did not show excellent strength, toughness and corrosion resistance because the proportion of the first component was outside the range specified in this invention. Samples Nos. 13 and 17 neither showed excellent strength, toughness and corrosion resistance because the proportion of the second component was outside the range specified in this invention. Samples Nos. 18 and 23 did not have excellent strength, toughness and corrosion resistance because the proportion of the third component was outside the range specified in this invention.

With sample No. 49, decomposition was vigorous and abnormal grain growth occurred because the sintering temperature was high. These samples were degraded in any of the above properties. Furthermore, it is clear that the excellent properties as in the present invention cannot be obtained if any of the first to the third component is lacking or another sintering aid is used, as in samples 50 to 54.

As stated above, the silicon carbide sintered bodies obtained by the process of this invention have excellent strength and toughness as a result of uniformly compacting the sintered bodies from inside to outside. They also have high corrosion resistance, and can provide contacting parts requiring high corrosion resistance under severe conditions, for example as skid buttons which come into contact with an iron material at high temperatures.

What is claimed is:

1. A process for producing a silicon carbide sintered body, which comprises the steps of:
   (a) mixing a starting material in powder form composed of 3.5 to 10% by weight, calculated as elemental aluminum, of aluminum nitride, 0.2 to 5% by weight, calculated as elemental chromium, of chromium carbide, and the balance being silicon carbide; and
   (b) sintering the mixed powder into an integrated molded article.

2. The process of claim 1 wherein the sintering is carried out at a temperature of 1850° to 2050° C.

3. The process of claim 1, wherein the mixed powder is molded under pressure before sintering.

4. The process of claim 1 wherein the mixed powder is sintered under pressure.

5. A process for producing a silicon carbide sintered body, which comprises the steps of:
   (a) mixing a starting material in powder form composed of 0.2 to 5% by weight, calculated as elemental aluminum, of aluminum nitride, 0.2 to 5% by weight, calculated as elemental rare earth, of at least one rare earth compound, and 0.2 to 10% by weight, calculated as elemental chromium, of chromium carbide, and the balance of silicon carbide; and
   (b) sintering the mixed powder into an integrated molded article.

6. The process of claim 5, wherein the starting powder contains 0.2 to 3% by weight, calculated as elemental aluminum, of the aluminum nitride, 0.2 to 2% by weight, calculated as elemental rare earth, of the rare earth compound, and 0.4 to 5% by weight, calculated as elemental chromium, of the chromium carbide.

7. The process of claim 5 wherein the sintering is carried out at a temperature of 1850° to 2050° C.

8. The process of claim 5, wherein the mixed powder is molded under pressure before sintering.

9. The process of claim 5 wherein the mixed powder is sintered under pressure.

10. A silicon carbide sintered body composed of 3.5 to 10% by weight, calculated as elemental aluminum, of aluminum nitride, 0.2 to 5% by weight, calculated as elemental chromium, of chromium carbide, and the balance being silicon carbide, wherein said silicon carbide is present in the sintered body as particles of the alpha-type crystal structure which are substantially spherical and have an average particle diameter of 0.5 to 2 micrometers, and particles which contain chromium as a main component and aluminum and silicon when analyzed by an x-ray microanalyzer and show a high luminance under a metallurgical microscope are present in the cystal grain boundary containing the aluminum and chromium components.

11. A silicon carbide sintered body composed of 0.2 to 5% by weight, calculated as elemental aluminum, of aluminum nitride, 0.2 to 5% by weight, calculated as elemental rare earth, of a rare earth compound, 0.2 to 10% by weight, calculated as elemental chromium, of chromium carbide, and the balance being silicon carbide, wherein said silicon carbide is present in the sintered body as particles of the alpha-type crystal structure which are substantially spherical and have an average diameter of 0.5 to 2 micrometers, and particles which contain chromium as a main component and aluminum and silicon when analyzed by an X-ray microanalyzer and show a high luminance under a metallurgical microscope are present in the crystal grain boundary containing the aluminum, rare earth and chromium components.

12. A silicon carbide sintered body composed of silicon carbide, 0.2 to 5% by weight, as Al based on the entire sintered body, of aluminum nitride, 0.2 to 10% by weight, as Cr based on the entire sintered body, of chromium carbide ($Cr_2C_3$) and 0.2 to 5% by weight, as elemental rare earth based on the entire sintered body, of a rare earth compound, wherein said silicon carbide is present in the sintered body as particles of the alpha-type crystal structure which are substantially spherical and have an average particle diameter of 0.5 to 2 micrometers, and particles which contain chromium as a main component and aluminum and silicon when analyzed by an X-ray microanalyzer and show a high luminance under a reflecton-type metal microscope are present in the crystal grain boundary containing the aluminum, rare earth and chromium components.

13. A process for producing a silicon carbide sintered body, which comprises the steps of:
   (a) mixing a starting material in powder form composed of 3 to 6% by weight, calculated as elemental aluminum, of aluminum nitride, 0.4 to 3.5 by weight, calculated as elemental chromium, of chromium carbide, and the balance being silicon carbide; and
   (b) sintering the mixed powder into an integrated molded article.

* * * * *